United States Patent [19]

Fukuda et al.

[11] Patent Number: 5,164,834
[45] Date of Patent: Nov. 17, 1992

[54] CAMERA HAVING A LIQUID CRYSTAL VIEW FINDER

[75] Inventors: Hiroshi Fukuda; Takao Ina, both of Minato, Japan

[73] Assignee: Fuji Photo Film Co. Ltd., Kanagawa, Japan

[21] Appl. No.: 767,720

[22] Filed: Sep. 30, 1991

[30] Foreign Application Priority Data

Oct. 4, 1990 [JP] Japan ................ 2-267037

[51] Int. Cl.⁵ ........................... H04N 5/225
[52] U.S. Cl. .................... 358/224; 358/209; 358/229; 358/225
[58] Field of Search ........... 358/229, 224, 209, 225, 358/217, 41

[56] References Cited

U.S. PATENT DOCUMENTS

| | | | |
|---|---|---|---|
| 4,772,902 | 9/1988 | Inoue et al. | 358/82 |
| 4,885,643 | 12/1989 | Ichimura et al. | 358/335 |
| 4,959,729 | 9/1990 | Fukoda et al. | 358/229 |
| 5,043,822 | 8/1991 | Ichiyoshi et al. | 358/229 |
| 5,070,406 | 12/1991 | Kinoshita | 358/224 |

FOREIGN PATENT DOCUMENTS 400944A 12/1990 European Pat. Off.
62-101184 5/1987 Japan.
276375 3/1990 Japan.

*Primary Examiner*—Herbert Goldstein
*Assistant Examiner*—Tuan V. Ho
*Attorney, Agent, or Firm*—Sughrue, Mion, Zinn, Macpeak & Seas

[57] ABSTRACT

A camera such as a video camera, an electronic still camera and the like which incorporates a liquid crystal view finder. The camera employs a liquid crystal view finder which uses a liquid crystal display panel having a smaller thickness than a cathode ray tube and requires no countermeasures against noise and the like. The liquid crystal display panel is disposed longitudinally of the camera and in parallel to the optical axis of a taking lens within a main body of the camera, and the display image of the liquid crystal display panel is guided from the side portion of the camera main body through a reflex mirror to an eyepiece part. Thus there is realized a compact view finder, which can in turn enhance the sense of integration between the camera main body and the view finder and also allows the size of the camera to be reduced.

3 Claims, 5 Drawing Sheets

CAMERA HAVING A LIQUID CRYSTAL VIEW FINDER

BACKGROUND OF THE INVENTION

1. Field of the Invention

The present invention relates to a camera such as a video camera, an electronic still camera and the like and, in particular, to a camera which incorporates a liquid crystal view finder.

2. Description of the Related Art

Generally, as a view finder of a video camera, there is employed a small-sized electronic view finder which uses a mono-chrome cathode ray tube (CRT) of 0.7 inches.

On the other hand, there has been an increased demand for viewing a finder image in color and, in recent years, there has been developed a video camera incorporating a liquid crystal view finder which uses a color liquid crystal panel in the order of one inch.

A cathode ray tube is incorporated in a view finder which is provided externally of a main body of a camera, in order to counter noise as well as to maintain safety. However, since such a cathode ray tube has a length in the order of 80 mm, the electronic view finder using a such cathode ray tube is of a large length, so that there is no sense of integration between the camera main body and the electronic view finder, further, the camera cannot be reduced in size.

SUMMARY OF THE INVENTION

The present invention aims at eliminating the drawbacks found in the above-mentioned conventional cameras.

Accordingly, it is an object of the invention to provide a camera which can improve the sense of integration between a camera main body and a finder part and also can reduce the size of the camera.

In order to attain the above object, according to the invention, there is provided a camera incorporating a liquid crystal view finder which comprises a liquid crystal display panel for displaying a finder image and an eyepiece part for viewing the display image of the liquid crystal panel, in which the liquid crystal view finder includes a reflex mirror for reflecting the display image of the liquid crystal panel and sending the same to the eyepiece part, the liquid crystal panel of the liquid crystal view finder is disposed within and longitudinally of a main body of the camera and in parallel to the optical axis of imaging lens, and the liquid crystal view finder is rotatably disposed in the side portion of the camera main body.

According to the invention, there is employed a liquid crystal view finder using a liquid crystal display panel which is smaller in thickness than a cathode ray tube and requires no countermeasures against noise and the like, and the liquid crystal display panel is incorporated in the camera in such a manner that it is positioned longitudinally of the camera and in parallel to the optical axis of the imaging lens within the camera main body. And, the display image on such liquid crystal display panel can be guided from the side portion of the camera main body to the eyepiece part through the reflex mirror. Therefore, the view finder can be reduced in size, which can enhance the sense of integration between the camera main body and the view finder and also reduce the size of the camera.

BRIEF DESCRIPTION OF THE DRAWINGS

The exact nature of this invention, as well as other objects, features and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENT

Detailed description will herein be given of the preferred embodiment of a camera according to the present invention with reference to the accompanying drawings.

Figure 1:
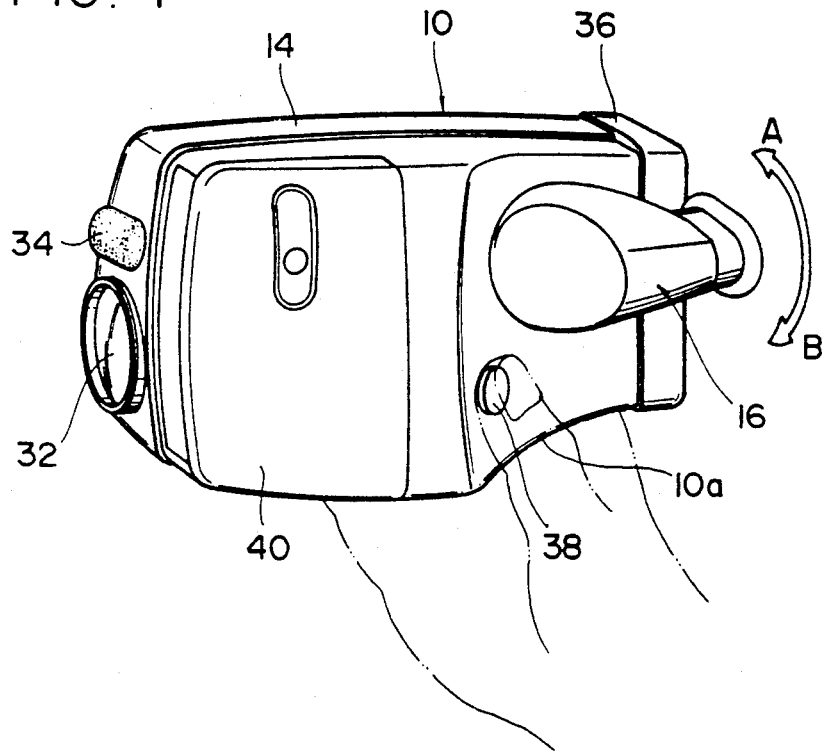
FIG. 1 is a perspective view of a video camera according to the invention.
Figure 2:
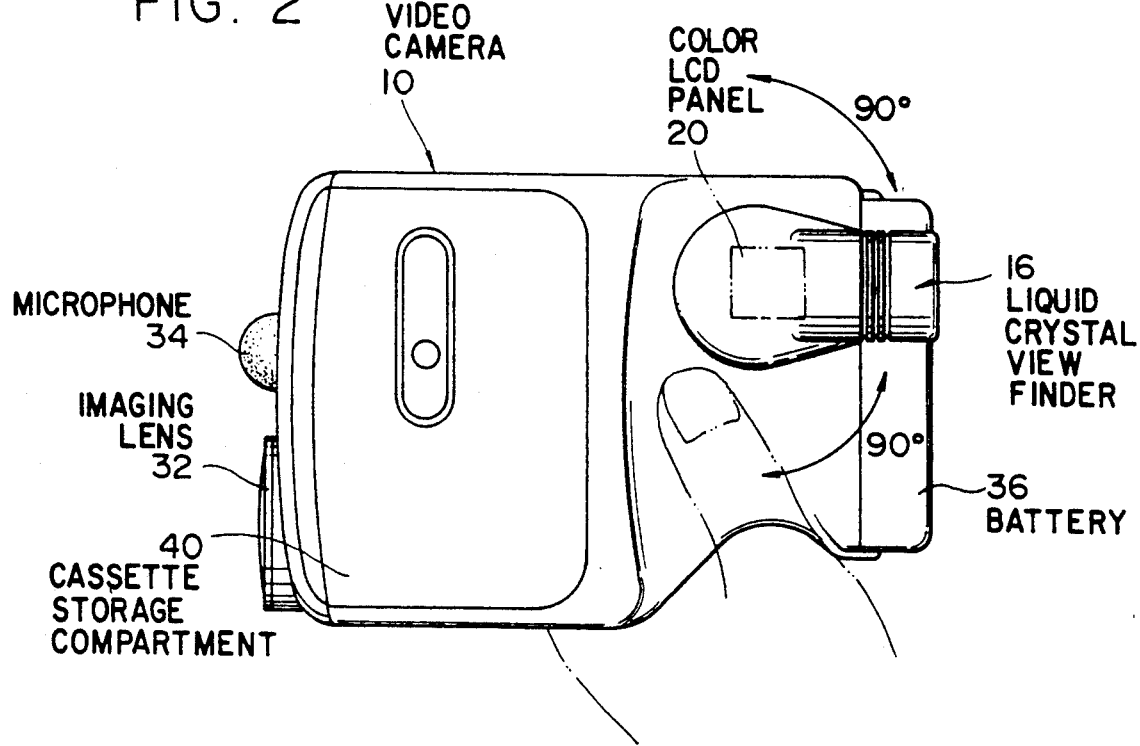
FIGS. 2 to 5 are respectively front view, rear view, plan view, and bottom view of a video camera according to the invention.
Figure 3:
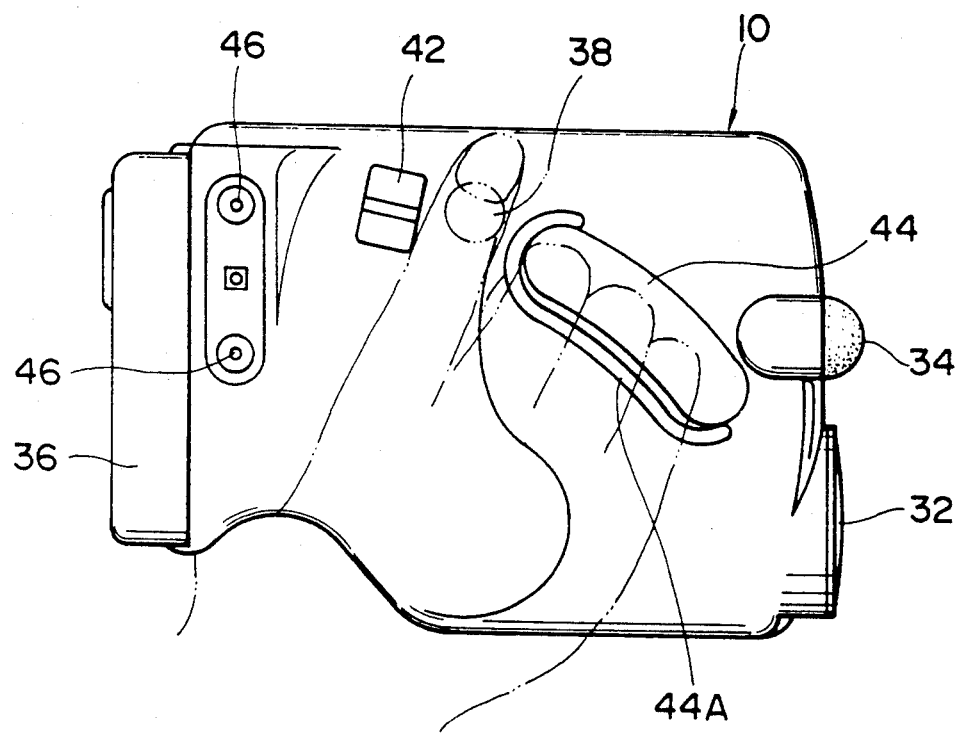
Figure 4:
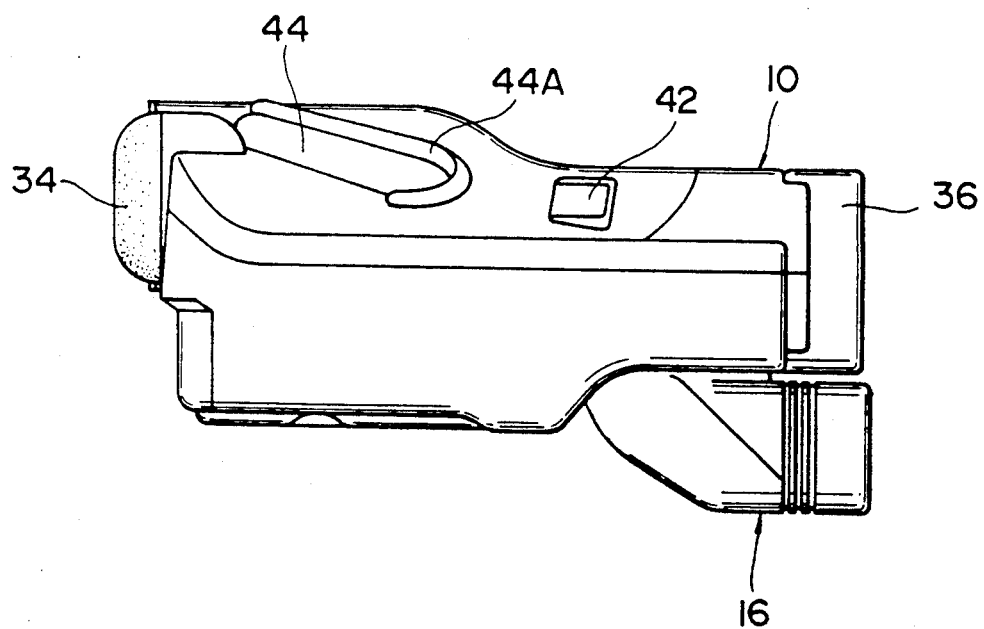
Figure 5:
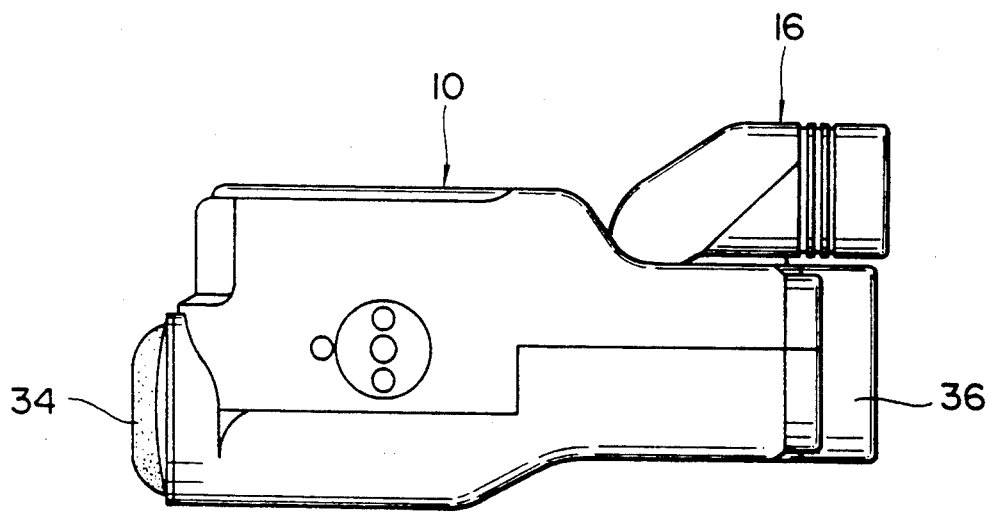

In FIG. 1, there is shown a perspective view of a camera according to the invention. As shown in FIG. 1, a video camera 10 has an appearance of substantially rectangular shape and in the bottom portion of the video camera 10 there is formed a hollow 10A. The hollow 10A has such a thickness that it can be placed on the palm of a photographer's hand. The camera is held by placing the hollow 10A in the palm of the photographer's hand between the photographer's right hand thumb and other fingers, such that the left and right side surfaces of the video camera 10 are held by and between the thumb and fingers, as shown in FIGS. 1 to 3. Further, on the side of the camera main body 14 in which the fingers are positioned, that is, on the right side of the camera main body 14, there is formed a finger hole 44. In the lower periphery of the finger hole 44, there is provided a projected portion 44A in order to make it easy for the fingers to be placed in the finger hole. As shown in the FIG. 3, the middle finger, the ring finger and the little finger can be placed in the finger hole 44. In this manner, the video camera 10 can be surely held in a photographing position by the photographer's hand.

Figure 6:
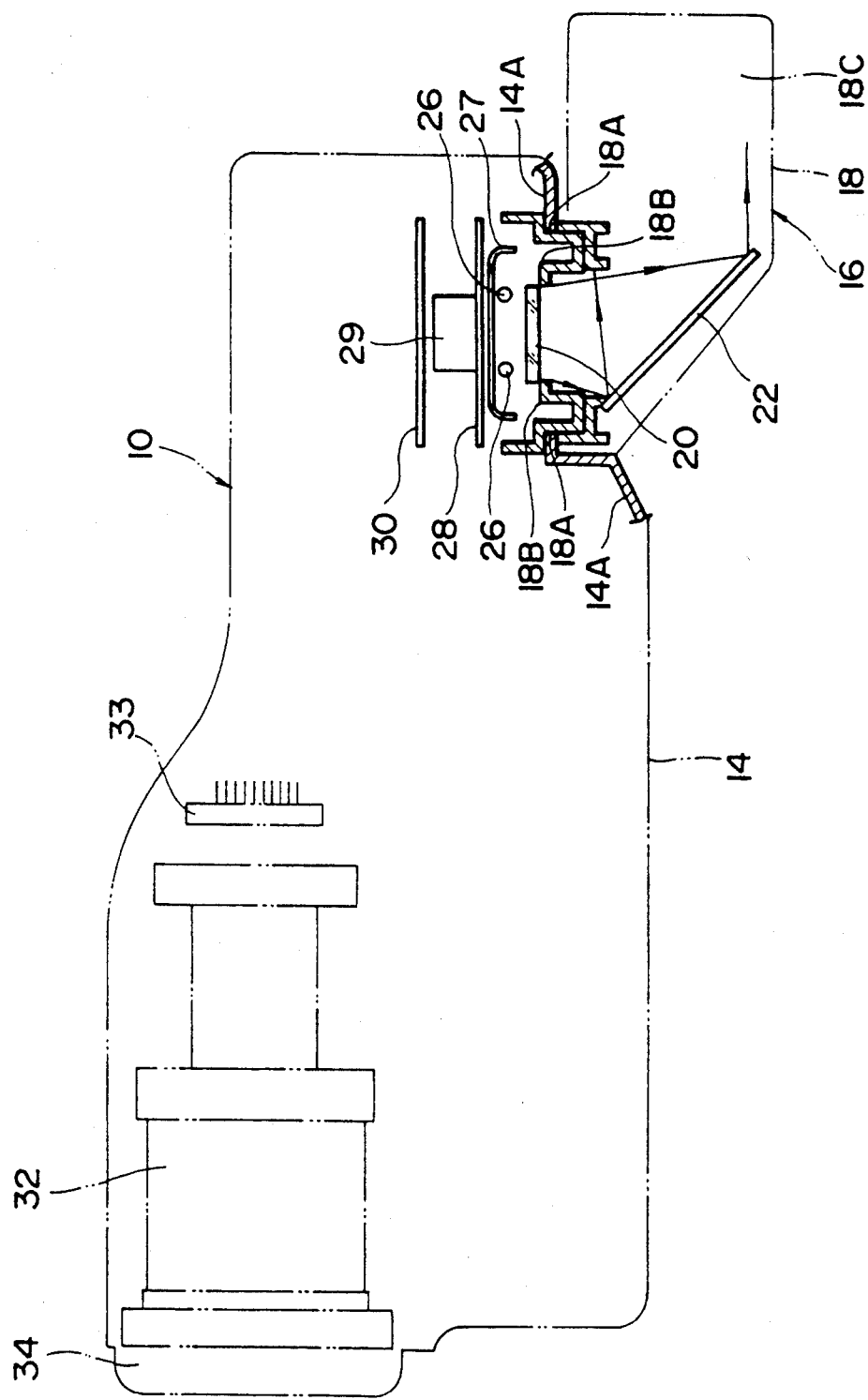
FIG. 6 is an enlarged view of the main portions of FIG. 4.
Figure 7:
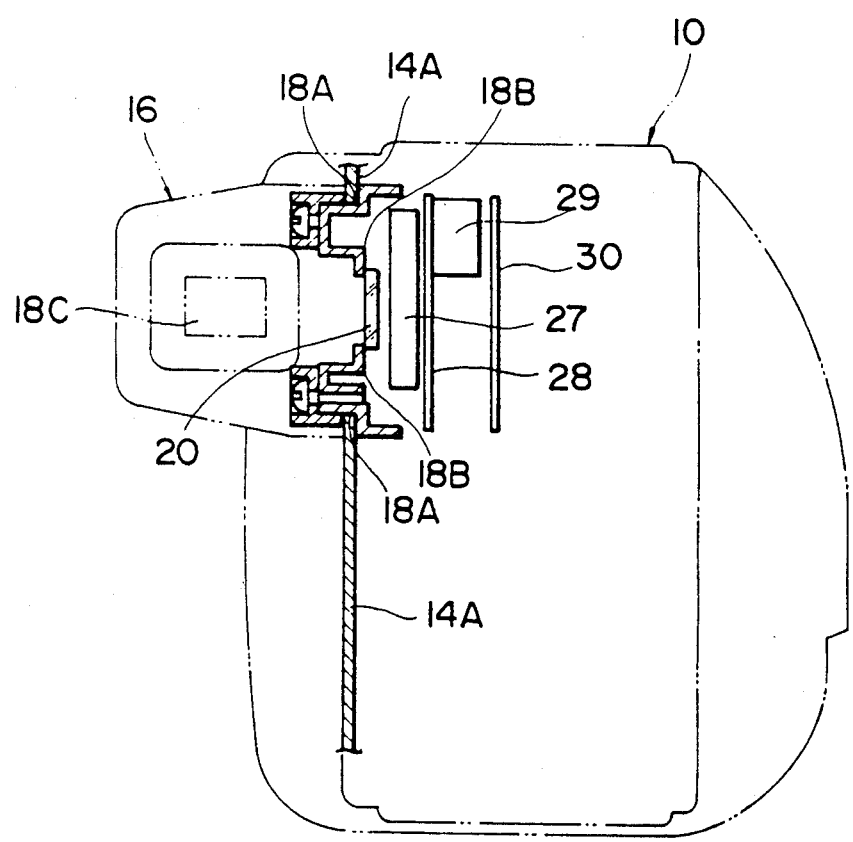
FIG. 7 is an enlarged view of the main portions of a video camera according to the invention, when viewed from behind the video camera.

On the left side of the camera main body 14 forming the video camera 10, there is provided a liquid crystal view finder 16 in such a manner that it can be freely rotated in a vertical direction (that is, in a direction of arrows A-B in FIG. 1). The liquid crystal view finder 16, as shown in FIGS. 6 and 7, comprises a finder barrel 18, a color liquid crystal display panel 20 (which will be hereinafter referred to as LCD), a reflex mirror 22 and the like. The finder barrel 18 is rotatably supported to and by a frame 14A forming part of the camera main body 14.

In other words, in the end portion of the finder barrel 18 that is mounted to the frame 14A, there is formed an annular groove 18A and the two side surfaces forming the annular groove 18A press and hold the frame 14A, which is fitted into the annular groove 18A, between them. That is, since there is produced a frictional force between the two side surfaces of the annular groove 18A and the fitting surface of the frame 14A, the finder barrel 18 can be retained at a given rotational position by means of this frictional force. The finder barrel 18, as shown in FIG. 2, can be rotated up to 90° upwardly and down to 90° downwardly from a horizontal position, that is, it is rotatable in a range of 180° in a vertical direction.

Further, in the end portion of the finder barrel 18 that is mounted to the frame 14A, there is provided a flange 18B, which flange 18B is embedded in the side portion of the frame 14A. The flange 18B has an edge which is disposed in parallel to the optical axis of an imaging lens provided in the camera main body. And, the LCD 20 is fixed to this edge of the flange 18B. For this reason, the LCD 20 can be rotated together with the finder barrel 18. Further, the LCD 20 is disposed within the camera main body 14 is such a manner that it is positioned longitudinally of the camera and in parallel to the optical axis of the taking lens.

The LCD 20 is able to photoelectrically convert a photo image taken from the imaging lens 32 by means of a CCD solid state image pickup element 33 (see FIG. 6), and is also able to display a video image in accordance with a video signal resulting from such photoelectric conversion. And, on the back surface of the LCD 20, there are provided back lights 26, 26 (for example, fluorescent lamps) to illuminate the LCD 20 and, in the rear of the back lights, there is provided a reflecting plate 27. In the rear of the reflecting plate 27, there is provided a power supply circuit 29 by means of a base plate 28. Also, within the power supply circuit 29, there is disposed a base plate 30 in parallel to the base plate 28.

Further, in the folded portion of the finder barrel 28, there is provided a reflex mirror 22 in such a manner that it is maintained at an angle of inclination of about 45° with respect to the LCD 20. The reflex mirror 22 is able to reflect an image, which is displayed in the LCD 20, by 90° and guide the image to an eyepiece which is provided in the eyepiece part 18C of the finder barrel 18. The eyepiece is used to expand the image.

Now, in FIG. 1, reference numeral 34 designates a microphone, 36 expresses a battery, 38 stands for a video recording switch, and 40 represents a cassette storage part. In FIG. 3, 42 designates a zoom switch and 46 stands for video terminals.

Next, description will be given below of the operation of a camera according to the invention constructed in the above mentioned manner.

At first, a photographer holds the video camera 10 at the photographing position and rotates the liquid crystal view finder 16 in the direction of arrows A-B in FIG. 1 to thereby position it at the best position.

In this case, the LCD 20 is rotated together with the finder barrel 18, because it is disposed in the finder barrel 18 of the liquid crystal view finder 16. For this reason, even the finder barrel 18 is rotated, the image displayed on the LCD 20 by means of the imaging lens 32 and the like can always be guided through the reflex mirror 22 in the same video state (for example, in a state in which the video image will never be rotated) to the eyepiece provided in the eyepiece part of the finder barrel 18.

In this state, if a desired object is caught, the video recording switch is operated with the photographer's thumb to initiate photographing.

Although in the above-mentioned embodiment the description has been given of a video camera, the invention is not limited to the video camera but the structure of the present invention can also apply to other kinds of cameras such as an electronic still camera and the like.

Also, although in the above-mentioned embodiment the description has been given of a case in which a color liquid crystal panel is used, this is not limitative, but the invention can also apply to a mono-chrome liquid crystal display panel. And, the finger hole 44 provided in the camera main body may be a recessed portion or a through hole. Further, although in the above embodiment, as shown in FIG. 1, the video recording switch 38 is provided at a position where it can be operated with the thumb, this is not limitative but, alternatively, the video recording switch can be disposed at a position shown by an imaginary line in FIG. 3 and can be operated with the index finger.

As has been described heretofore, according to the camera of the present invention, due to the fact that the liquid crystal panel of the view finder is disposed vertically within the camera main body and in parallel to the optical axis of the taking lens so that the display image of the liquid crystal panel is reflected from the side portion of the camera and is then guided to the eyepiece part, the size of the view finder can be reduced.

This can enhance the sense of integration between the camera main body and the view finder and further can minimize the size of the video camera.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A camera incorporating a liquid crystal view finder comprising a liquid crystal display panel for displaying a finder image, an eyepiece for viewing a display image of said liquid crystal display panel, a reflex mirror for reflecting and sending said display image of said liquid crystal display panel to said eyepiece, and a finder barrel having formed therein an annular groove having a frame member of said camera main body fitted therein, wherein said liquid crystal display panel is disposed within and longitudinally of a camera main body and in parallel to an optical axis of an imaging lens, and said liquid crystal view finder and liquid crystal display panel are rotatably disposed in a side portion of said camera main body and said liquid crystal view finder is arranged in such a manner that the end face of said finder barrel is embedded in said camera main body and said liquid crystal display panel is disposed on said embedded end face.

2. A camera as set forth in claim 1, wherein said liquid crystal view finder can be rotated from a horizontal position to 90° upwardly and to 90° downwardly.

3. A camera as set forth in claim 1, wherein two side walls forming said annular groove press and hold said frame member of said camera main body inserted into said annular groove such that said liquid crystal view finder is held at a desired rotational position.

* * * * *